(12) United States Patent
Suzuki

(10) Patent No.: US 8,643,677 B2
(45) Date of Patent: Feb. 4, 2014

(54) IMAGE PROCESSING APPARATUS AND IMAGE PROCESSING METHOD, AND PROGRAM THEREFOR

(75) Inventor: Hiroyuki Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 136 days.

(21) Appl. No.: 13/343,469

(22) Filed: Jan. 4, 2012

(65) Prior Publication Data
US 2012/0206487 A1 Aug. 16, 2012

(30) Foreign Application Priority Data

Feb. 14, 2011 (JP) ................................. 2011-028197

(51) Int. Cl.
*G09G 5/00* (2006.01)
(52) U.S. Cl.
USPC ....................................................... 345/635
(58) Field of Classification Search
None
See application file for complete search history.

(56) References Cited

U.S. PATENT DOCUMENTS

| 7,437,678 B2 * | 10/2008 | Awada et al. ................. 715/784 |
| 7,609,847 B2 * | 10/2009 | Widdowson et al. ......... 382/100 |
| 7,703,011 B2 * | 4/2010 | Yamakado et al. ........... 715/243 |
| 7,962,862 B2 * | 6/2011 | Kulp et al. .................... 715/856 |
| 2008/0276159 A1 * | 11/2008 | Narayanaswami et al. ... 715/202 |
| 2010/0053213 A1 * | 3/2010 | Ishida et al. .................. 345/629 |

FOREIGN PATENT DOCUMENTS

WO  WO 2008/041313        4/2008
WO  WO 2010038388 A1 *    4/2010

* cited by examiner

*Primary Examiner* — Hau Nguyen
*Assistant Examiner* — Ryan M Gray
(74) *Attorney, Agent, or Firm* — Oblon, Spivak, McClelland, Maier & Neustadt, L.L.P.

(57) ABSTRACT

An apparatus includes an overlap detector and a display modification unit. The overlap detector is configured to determine if a first image superimposed with a second image overlaps an object in the second image by greater than a threshold. The display modification unit is configured to change the content of the first image superimposed with the second image such that the first image no longer overlaps the object in the second image by greater than the threshold when the overlap detector detects that the first image overlaps the object in the second image by greater than the threshold.

17 Claims, 8 Drawing Sheets

IMAGE PROCESSING APPARATUS AND IMAGE PROCESSING METHOD, AND PROGRAM THEREFOR

CROSS REFERENCE TO RELATED APPLICATIONS

The present application is based upon and claims the benefit of priority under 35 U.S.C. §119 of Japanese Priority Patent Application JP 2011-028197 filed in the Japan Patent Office on Feb. 14, 2011, the entire contents of which are hereby incorporated by reference.

BACKGROUND

The present disclosure relates to an image processing apparatus and an image processing method, and a program therefor. In more detail, the present disclosure relates to an image processing apparatus and an image processing method, and a program therefor with which a display is realized where sense of discomfort is suppressed when an overlap display of additional information such as a message, a superimposed title, or an icon on another three-dimensional image object is carried out in a three-dimensional image display.

In these days, display apparatuses that can display a three-dimensional image (3D image) such as a television set and a PC and also a video camera, a still camera, and the like that can record a three-dimensional image (3D image) have been developed and utilized. Display processing is carried out on the 3D image by utilizing images picked up from different view points, in this instance, an image for the left eye and an image for the right eye.

In a case where the above-mentioned display of the three-dimensional image is carried out, when the additional information such as a message, a superimposed title, an error display, a menu, or an icon is overlapped on the three-dimensional image to be displayed, depending on a state of the three-dimensional display, a sense of discomfort may be generated when the additional information is overlapped, and a problem occurs upon the visual recognition of the three-dimensional image.

For example, in a case where the additional information is displayed at a position of just 0 in terms of a three-dimensional depth location (a center in a depth direction (far side)/a pop-up direction (near side) of the display image), in a case where an object part subjected to a pop-up display which is displayed on the near side with respect to the 0 position is overlapped with the display position of the additional information, a situation is developed in which a part of the object (display object) popping up toward the near side visually looks retracted in the back, which causes a viewer to have the sense of discomfort.

A related-art technology disclosing a configuration for solving the above-mentioned situation includes Domestic Re-publication of PCT international Publication for Patent Application No. W2008/41313: Image display apparatus (Pioneer), which will be referred to as Patent Document 1.

With regard to the additional information overlapped on the original three-dimensional image, Patent Document 1 proposes a method of changing a relative position of the additional information in the depth direction, setting the additional information at the display on the nearest side which has the maximum parallax, and further, changing the display position to change the overlapping position.

However, similarly as in the configuration disclosed in Patent Document 1, if a dynamic control is carried out where the additional information is regularly placed immediately before the object having the most intense pop-up effect in a three-dimensional moving image display, the visibility becomes deteriorated since the display position of the additional information itself is changed.

To avoid this, for example, a setting of fixing the display position of the additional information is conceivable so that the additional information is regularly located in front of all objects of the three-dimensional image constituting a series of moving images. However, in this setting, the additional information is displayed in front of the position having the maximum right-and-left parallax. In a case where the three-dimensional image is located relatively in the depth direction, since a difference of the depth between the three-dimensional image and the additional information becomes large, the visibility becomes deteriorated.

Furthermore, a configuration is also proposed in which the additional information is affixed on an object having a depth in a predetermined range, but the object may not have an area where the additional information can be displayed, for example, an area into which characters can be fit. In a case where the above-mentioned countermeasures are conducted, a problem occurs that the additional information may not be displayed.

SUMMARY

The present disclosure has been made in view of the above-mentioned circumstances, for example, and it is desirable to provide an image processing apparatus and an image processing method, and a program therefor with which it is possible to prevent a decrease in the visibility in a case where an overlap display of the additional information such as various messages is carried out upon a three-dimensional image display processing.

This invention broadly comprises an apparatus, a method, and a computer readable medium encoded with a program which causes a processor to perform the method. In one embodiment, the apparatus includes an overlap detector and a display modification unit. The overlap detector is configured to determine if a first image superimposed with a second image overlaps an object in the second image by greater than a threshold. The display modification unit is configured to change the content of the first image superimposed with the second image such that the first image no longer overlaps the object in the second image by greater than the threshold when the overlap detector detects that the first image overlaps the object in the second image by greater than the threshold.

DETAILED DESCRIPTION OF EMBODIMENTS

Figure 1:
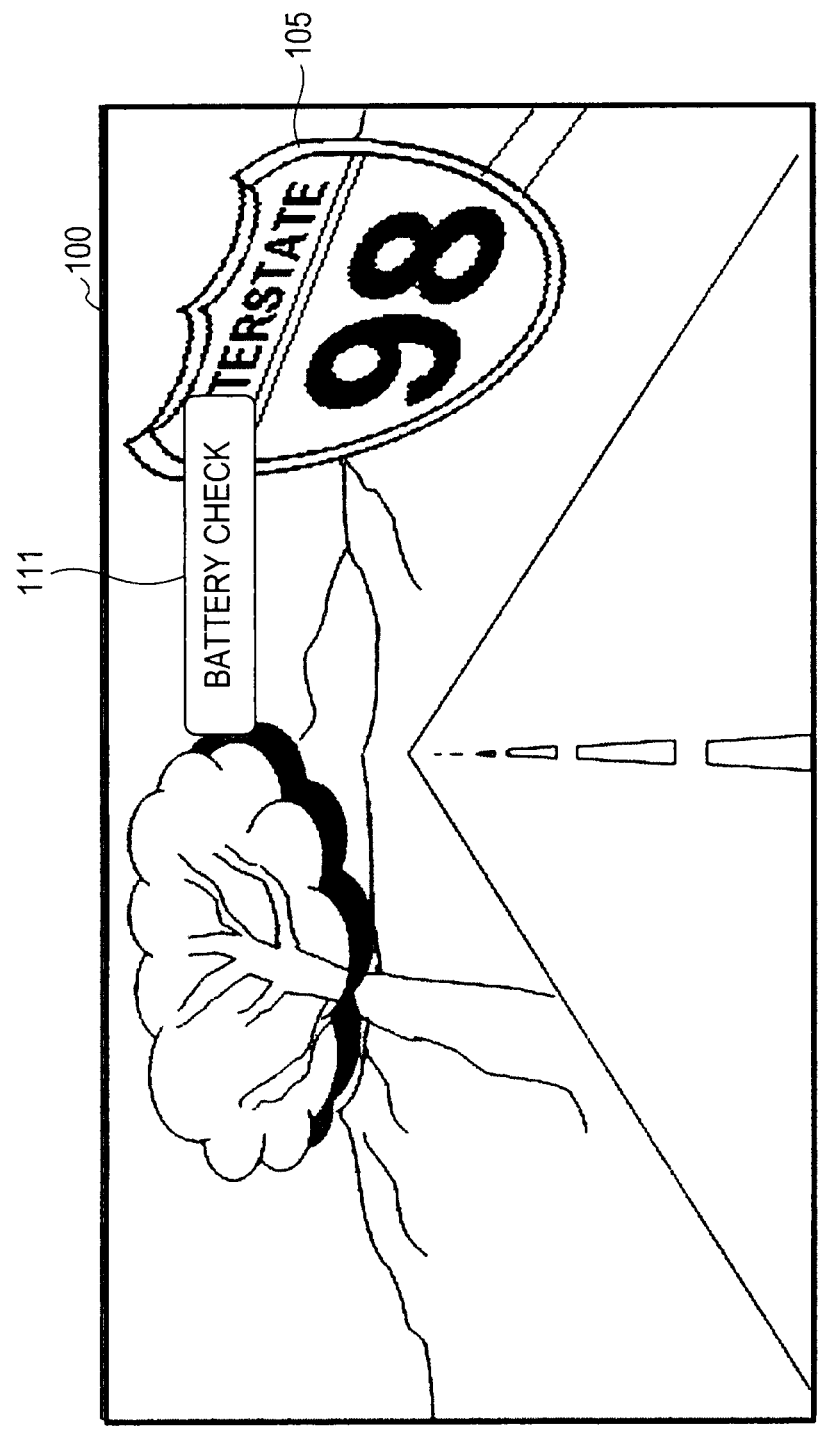
FIG. 1 is an explanatory diagram for describing a display processing example of additional information.

Hereinafter, with reference to the drawings, details of an image processing apparatus and an image processing method, and a program therefor according to an embodiment of the present disclosure will be described. The description will be given in accordance with the following items.

1. Regarding a detail of a processing executed by the image processing apparatus 1-(1) Processing example for adjusting the number of displayed characters of additional information (processing example 1)

1-(2) Processing example for adjusting a displayed character size of the additional information (processing example 2)

1-(3) Processing example for changing a display of the additional information into an icon (processing example 3)

1-(4) Processing example for carrying out a line feed adjustment of a character string of the additional information (processing example 4)

1-(5) Processing example in which the processing examples 1 to 4 are combined (processing example 5)

2. Regarding a detail of a processing sequence executed by the image processing apparatus 3. Regarding a hardware configuration example of the image processing apparatus 1. Regarding a Detail of a Processing Executed by the Image Processing Apparatus At the time of a display of a three-dimensional image, additional information to be displayed includes, for example, a message, a superimposed title, an error display, a menu, an icon, and the like. A description will be given of a detail of a processing for displaying these pieces of additional information without causing a sense of discomfort.

Hereinafter, as specific plural processing examples, the additional information is overlapped with the three-dimensional image to be displayed, the following processing examples (1) to (5) will be sequentially described.

(1) Processing example for adjusting the number of displayed characters of the additional information (processing example 1)

(2) Processing example for adjusting a displayed character size of the additional information (processing example 2)

(3) Processing example for changing a display of the additional information into an icon (processing example 3)

(4) Processing example for carrying out a line feed adjustment of the character string of the additional information (processing example 4)

(5) Processing example in which the processing examples 1 to 4 are combined (processing example 5)

1-(1) Processing Example for Adjusting the Number of Displayed Characters of the Additional Information (Processing Example 1)

As the processing example 1, a processing example for adjusting the number of displayed characters of the additional information will be described.

According to the present process example, first, the additional information is displayed at a fixed position where the depth is set as a prescribed value. For example, the display is carried out while the depth position of the three-dimensional image is set as 0 (the center in the depth direction (far side)/the pop-up direction (near side) of the display image). It should be noted that the example in which the display position of the additional information is set as the depth position=0 is merely an example, and the display position may be fixed at another depth position.

In this manner, the processing example 1 is an effective processing example in a case where the display position of the additional information is fixed at the predetermined depth position, for example, a case where the displayed object (display object) whose position is overlapped with the additional information display position and also which is displayed in front of the additional information is included.

In the above-mentioned case, the processing of reducing the number of the characters of the additional information to the previously prescribed number is carried out so that the meaning of the additional information is still understandable to avoid the overlap of the object (display object) displayed in front of the additional information and the additional information.

This display control processing example of the additional information will be described with reference to FIG. 1 and FIG. 2.

As illustrated in FIG. 1, the present processing example 1 is an effective processing in a case where additional information 111 overlapped on a three-dimensional image 100 to be displayed is the character string such as the error, the message, the superimposed title, or the menu.

As illustrated in FIG. 1, in a case where the character string originally desired to be displayed as the additional information 111 is 12 characters:

"BATTERY CHECK"

if the entirety of these characters is to be displayed, the character string is overlapped with a three-dimensionally displayed object that looks popping up from the position of the depth 0 which is the display position of the additional information, in this instance, a display object 105 (road sign) on the right side.

If the above-mentioned overlap occurs, only the overlapped part looks dented to the depth 0.

Figure 2:
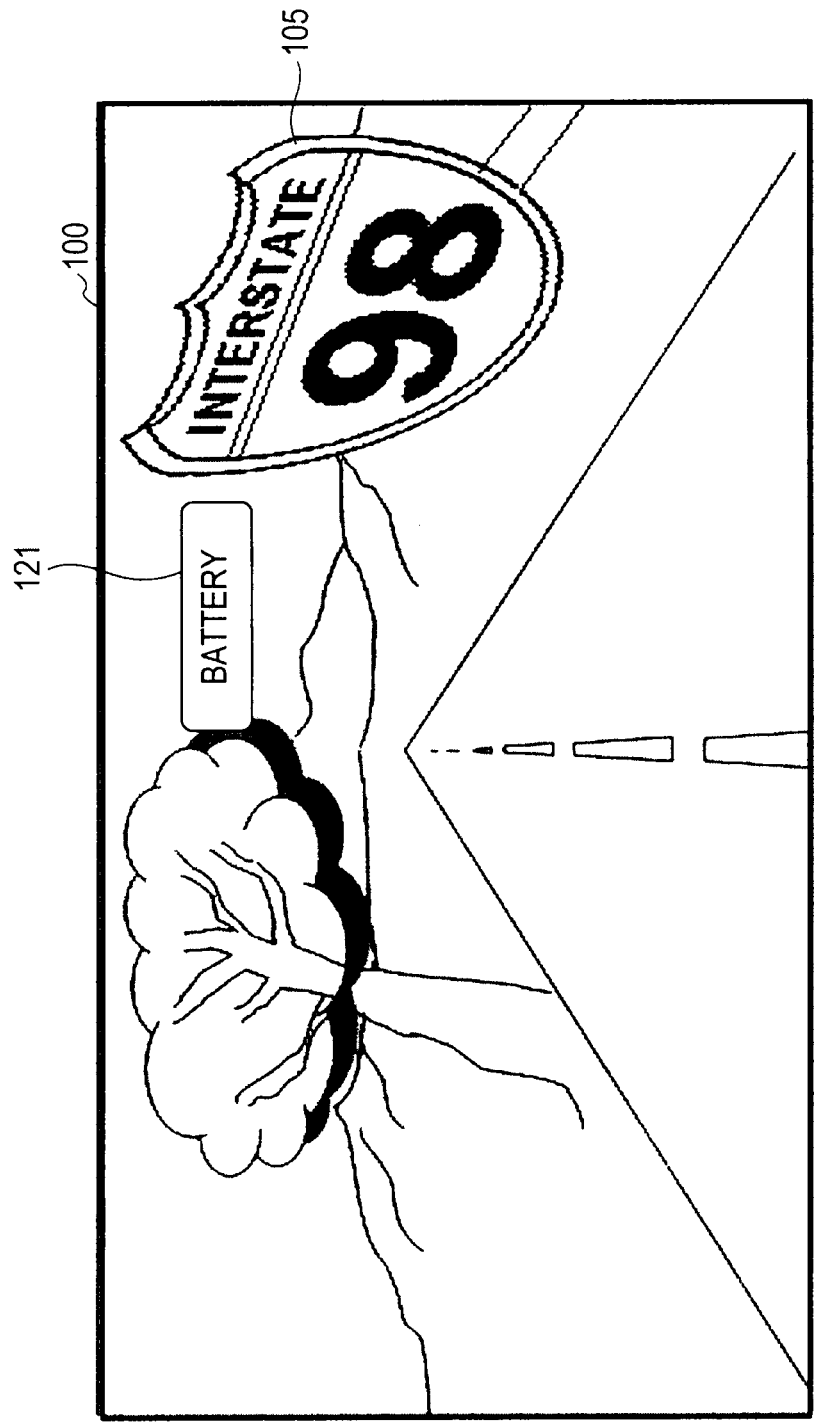
FIG. 2 is an explanatory diagram for describing a display processing example of the additional information which is controlled while following a processing example 1.

In a case where the additional information expected to be displayed takes the mode illustrated in FIG. 1, the image processing apparatus according to the embodiment of the present disclosure executes the additional information display control illustrated in FIG. 2.

That is, as illustrated in FIG. 2, the number of the displayed characters of the additional information is reduced, and the displayed area of the additional information is adjusted. To be more specific, a position and a size of characters displayed as additional information 121 are unchanged, and the character string to be displayed is changed from "BATTERY CHECK" into

"BATTERY"

and the number of the displayed characters is reduced.

In the example illustrated in FIG. 2, the 12-character display is changed into a seven-character display. Through this processing, the displayed area of the additional information is reduced, and as a result, the generation of the overlapped area of the display object 105 (road sign) on the right and the additional information 121 can be avoided.

In this manner, by displaying the additional information 121 while the area to be overlapped with the display object 105 (road sign) that looks popping up is avoided, the display object 105 (road sign) that looks popping up can be observed as the object having the natural pop-up effect, and the additional information 121 can be naturally observed at the position where the depth position=0.

1-(2) Processing Example for Adjusting a Displayed Character Size of the Additional Information (Processing Example 2)

Next, as the processing example 2, a processing example for adjusting the displayed character size of the additional information will be described.

Similarly as in the processing example 1, also in the present processing example, the additional information is displayed at the predetermined depth position. For example, as the depth position of the three-dimensional image, the display is carried out at the position of 0 (the center in the depth direction (far side)/the pop-up direction (near side) of the display image).

Similarly as in the processing example 1, the processing example 2 is also, for example, an effective example in a case where the displayed object (display object) whose position is overlapped with the display position of the additional information where the depth is fixed and also which is displayed in front of the additional information is included.

According to the present process example, in a case where the display object whose display position is overlapped with the display position of the additional information and which is displayed, for example, in front of the additional information exists, a character font size of the additional information is decreased to avoid the overlap part.

Figure 3:
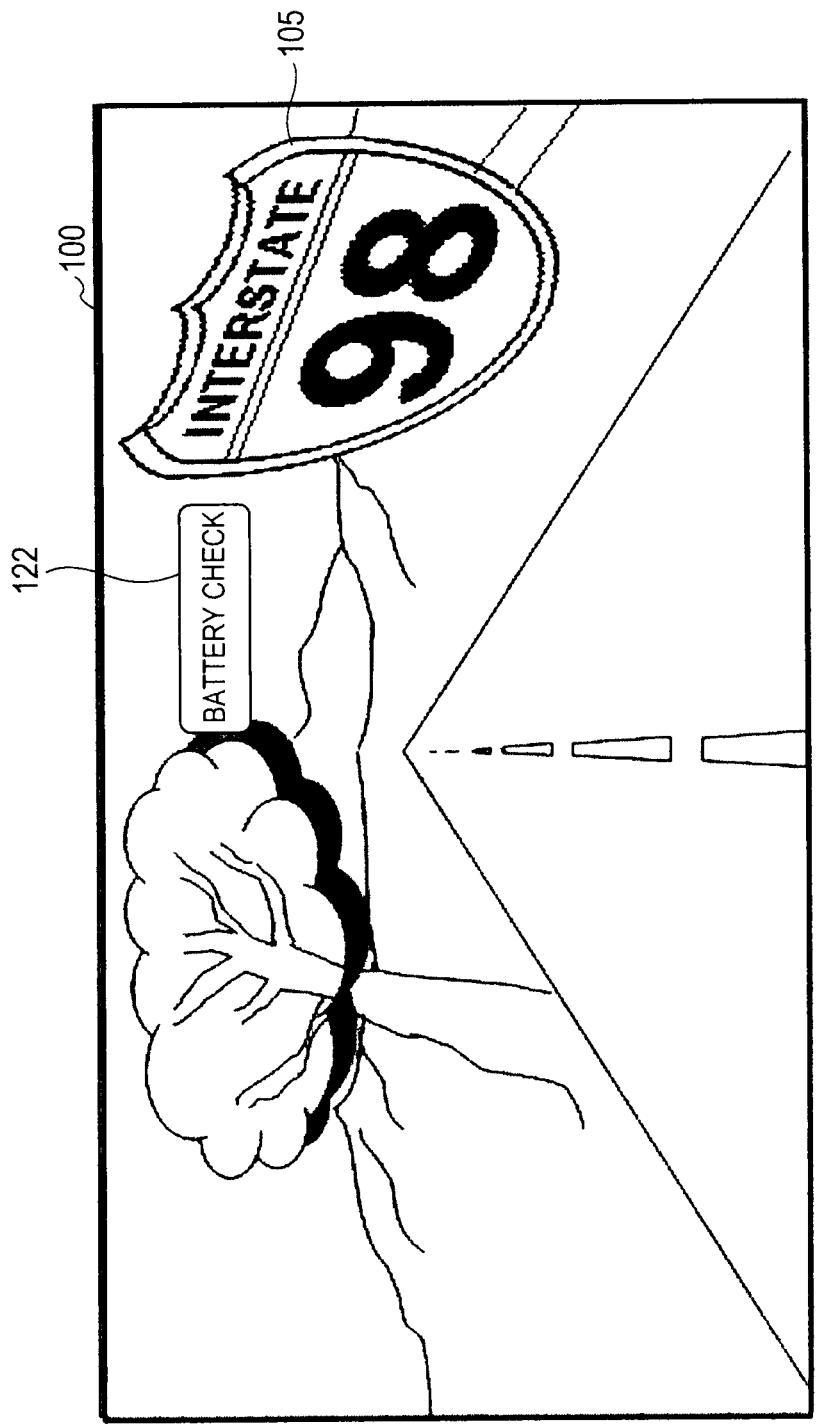
FIG. 3 is an explanatory diagram for describing a display processing example of the additional information which is controlled while following a processing example 2.

Similarly as in the previously described processing example 1, in a case where the additional information expected to be displayed takes the mode illustrated in FIG. 1, the image processing apparatus according to the embodiment of the present disclosure executes the display control on the additional information illustrated in FIG. 3.

That is, as illustrated in FIG. 3, the displayed character size of the additional information is decreased to adjust the displayed area of the additional information. To be more specific, the position of the characters displayed as the additional information 122 is unchanged, and the displayed character size is decreased to reduce the displayed area of the additional information.

Similarly as in the processing example 1, the present processing example 2 is also a method of avoiding the overlap of the additional information and the display object, but the display information is not reduced by decreasing the character size. In the example illustrated in FIG. 3, even in the case of the same characters "BATTERY CHECK", by changing the character size to be decreased, it is possible to avoid the overlap with the pop-up part of the three-dimensional image.

According to the present process example too, by displaying the additional information 122 while the area to be overlapped with the display object 105 (road sign) that looks popping up is avoided, the display object 105 (road sign) that looks popping up can be observed as the object having the natural pop-up effect, and the additional information 122 can be naturally observed at the position where the depth position=0.

1-(3) Processing Example for Changing the Display of the Additional Information into an Icon (Processing Example 3)

Next, as the processing example 3, a processing example for changing the display of the additional information into an icon will be described.

Similarly as in the processing examples 1 and 2, in the present processing example, the additional information is displayed at the predetermined depth position. For example, as the depth position of the three-dimensional image, the display is carried out at the position of 0 (the center in the depth direction (far side)/the pop-up direction (near side) of the display image).

Similarly as in the processing example 1, the processing example 3 is also, for example, an effective example in a case where the displayed object (display object) whose position is overlapped with the display position of the additional information where the depth is fixed and also which is displayed in front of the additional information is included.

According to the present process example, in a case where the display object whose display position is overlapped with the display position of the additional information and which is displayed, for example, in front of the additional information exists, the overlap part is avoided by changing the display of the additional information into the icon. That is, the character string display is changed into the icon display.

Figure 4:
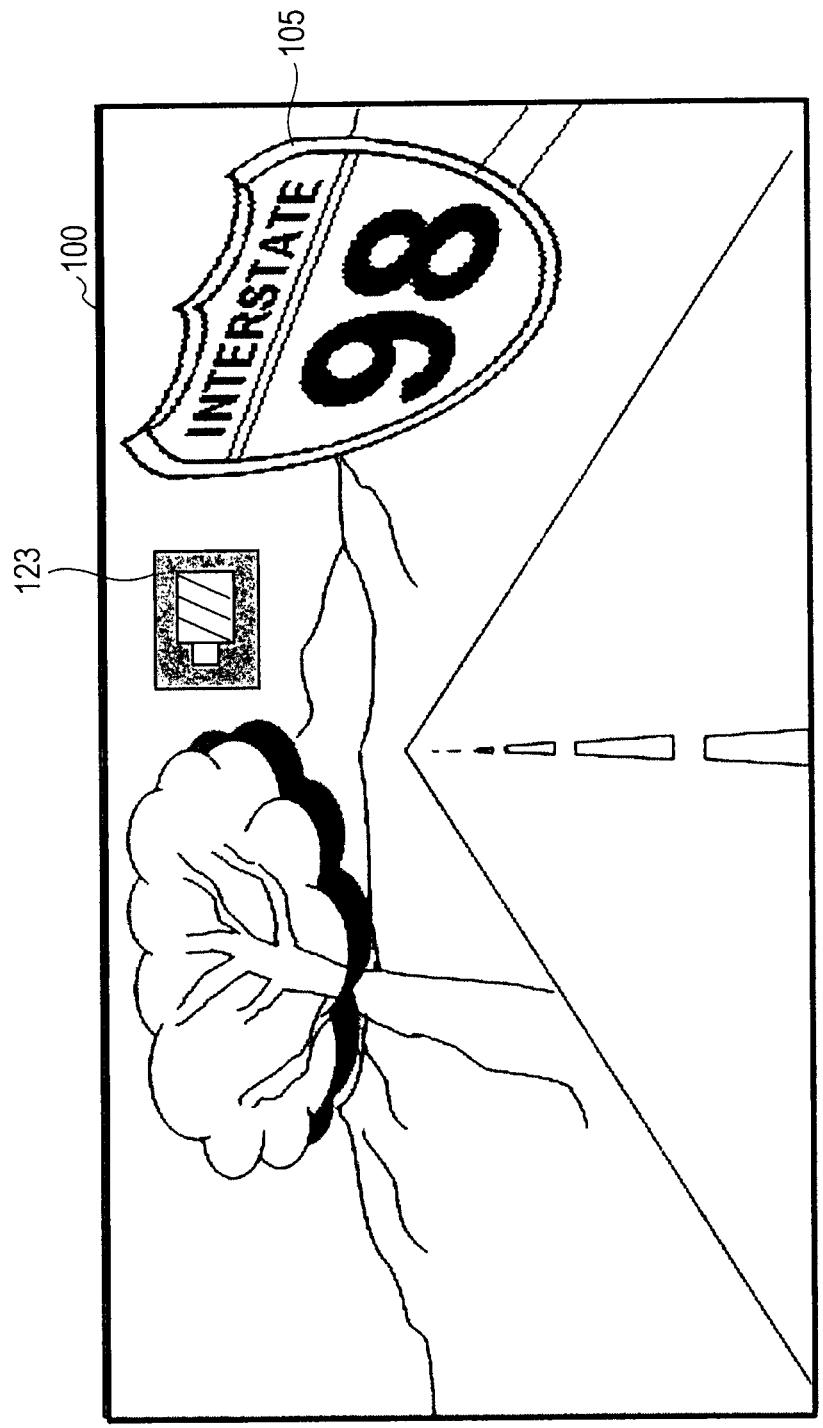
FIG. 4 is an explanatory diagram for describing a display processing example of the additional information which is controlled while following a processing example 3.

Similarly as in the previously described processing example 1, in a case where the additional information expected to be displayed takes the mode illustrated in FIG. 1, the image processing apparatus according to the embodiment of the present disclosure changes the display mode of the additional information as illustrated in FIG. 4. To be more specific, for example, a display mode change processing of changing the mode from the character string display into the icon display is carried out.

That is, the additional information 111 composed of the character string of "BATTERY CHECK" illustrated in FIG. 1 is changed, as illustrated in FIG. 4, into additional information 123 composed of an "icon" which is suggestive of the battery check.

Similarly as in the processing examples 1 and 2, the present processing example 3 too is a method of avoiding the overlap of the additional information and the display object, but, for example, by changing the mode into the display mode utilizing the icon, it is possible to significantly reduce the display area even in a case where the number of the displayed characters is large. In the example illustrated in FIG. 4, by changing the character string display of "BATTERY CHECK" illustrated in FIG. 1 into the additional information 123 based on the icon illustrated in FIG. 4, the displayed area of the additional information is significantly reduced, and the overlap of the additional information and the pop-up object 105 of the three-dimensional image can be avoided.

If the display area is to be reduced by utilizing the character information in a case where the additional information composed of the character information such as the error, the message, the superimposed title, or the menu is displayed, the method of reducing the number of characters into the maximum number of characters with which the information can be conveyed like the above-mentioned processing examples 1 and 2 or the method of decreasing the character size is adopted. However, regarding the number of characters to be reduced, the data that can be reduced each varies in accordance with various displayed character strings. Furthermore, one or more prescribed numbers of characters to be reduced are held as separate data for each character string information, and at the time of the overlap determination, the determination on the relevant area becomes somewhat complicated. In addition, the visibility becomes deteriorated if the character size is overly decreased, and a limit on the decrease in the character size also exists.

In contrast to this, by changing the character display like the processing example 3 illustrated in FIG. 4 into the icon display, it is possible to significantly reduce the display area as compared with the display information based on the character string. Also, no difference in the area exists depending on the information, and further one type of the icon substituted into the character information may be prepared to one pieces of character information, so that it is possible to reduce the used capacity of the memory or the processing load.

1-(4) Processing Example for Carrying Out a Line Feed Adjustment of the Character String of the Additional Information (Processing Example 4)

Next, as the processing example 4, a processing example for carrying out the line feed adjustment of the character string of the additional information will be described.

Similarly as in the above-mentioned processing examples 1 to 3, in the present processing example too, the additional information is displayed at the predetermined depth position. For example, as the depth position of the three-dimensional image, the display is carried out at the position of 0 (the center in the depth direction (far side)/the pop-up direction (near side) of the display image).

Similarly as in the processing examples 1 to 3, the processing example 3 is also, for example, an effective example in a case where the displayed object (display object) whose position is overlapped with the display position of the additional information where the depth is fixed and also which is displayed in front of the additional information is included.

According to the present process example, in a case where the display object whose display position is overlapped with the display position of the additional information and which is displayed in front of the additional information exists, a line is fed into the character string of the additional information to change the lines, and a shape of the displayed area of the additional information is changed so that the part overlapped with the other three-dimensional display object is avoided.

Figure 5:
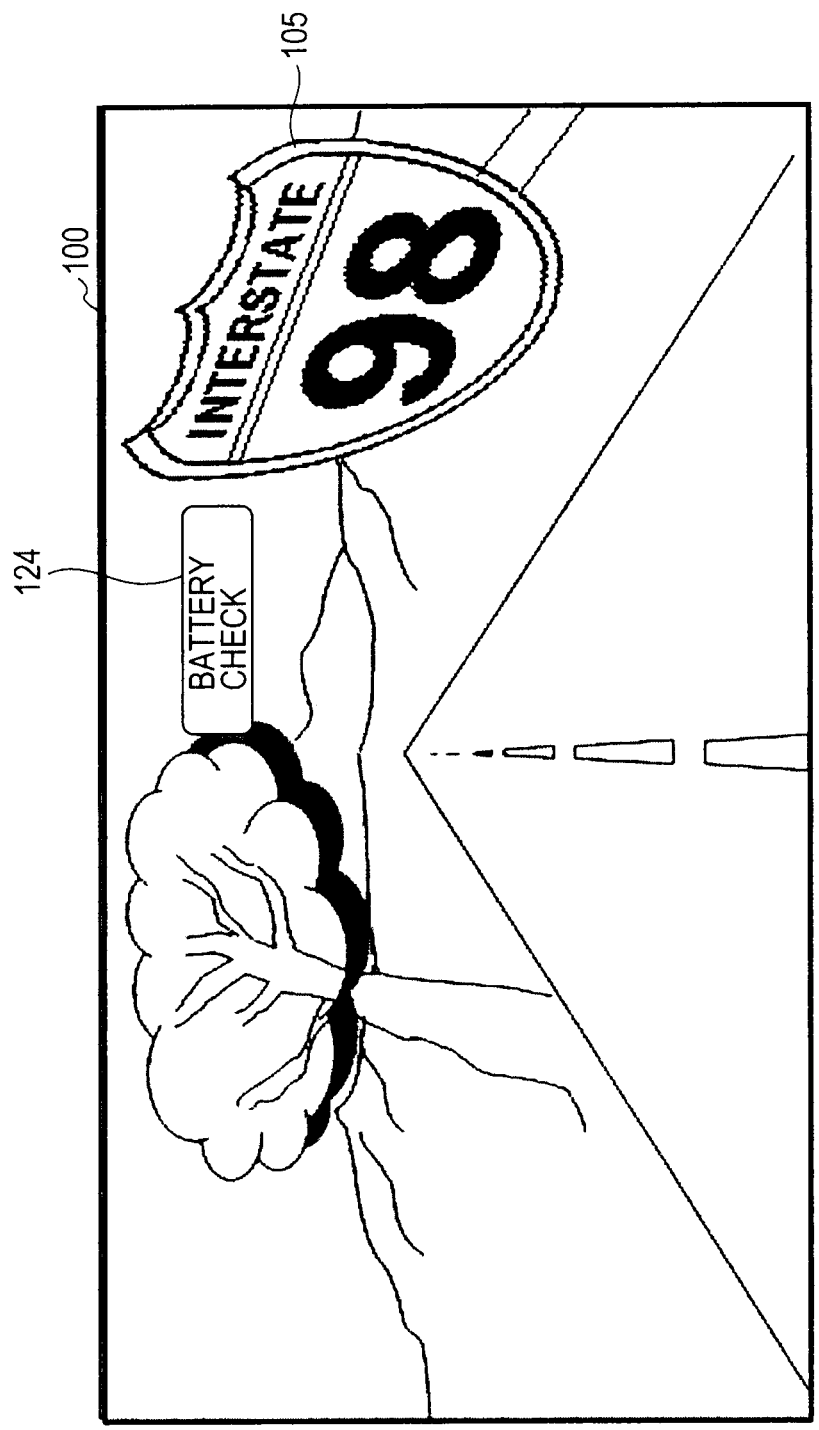
FIG. 5 is an explanatory diagram for describing a display processing example of the additional information which is controlled while following a processing example 4.

Similarly as in the previously described processing example 1, in a case where the additional information expected to be displayed takes the mode illustrated in FIG. 1, the image processing apparatus according to the embodiment of the present disclosure executes the display control on the additional information illustrated in FIG. 5.

That is, as illustrated in FIG. 5, a line is fed into a character string of additional information 124 to change a paragraph. Through the above-mentioned processing, the display area of the additional information 124 is changed, and the overlap area with the display object which is displayed in front of the additional information is eliminated.

Similarly as in the other processing examples, the present processing example 4 is also a method of avoiding the overlap of the additional information and the display object, but without decreasing the character size, it is possible to avoid the overlap with the pop-up part of the three-dimensional image while all the character information can be displayed.

According to the present process example too, by displaying the additional information 124 while the area to be overlapped with the display object 105 (road sign) that looks popping up is avoided, the display object 105 (road sign) that looks popping up can be observed as the object having the natural pop-up effect, and the additional information 124 can be naturally observed at the position where the depth position=0.

1-(5) Processing Example in which the Processing Examples 1 to 4 are Combined (Processing Example 5)

Although the above-mentioned processing example 1 to processing example 4 can be individually utilized, the processing examples also can be utilized by arbitrarily combining two or more processing examples. For example, if the overlap area of the additional information and the three-dimensional display object relatively largely remains in a case where the above-mentioned processing example 1 to processing example 4 are individually utilized, by combining the respective methods and furthermore by reducing or changing the displayed area of the additional information, the overlap area with the other three-dimensional display object is avoided.

Figure 6:
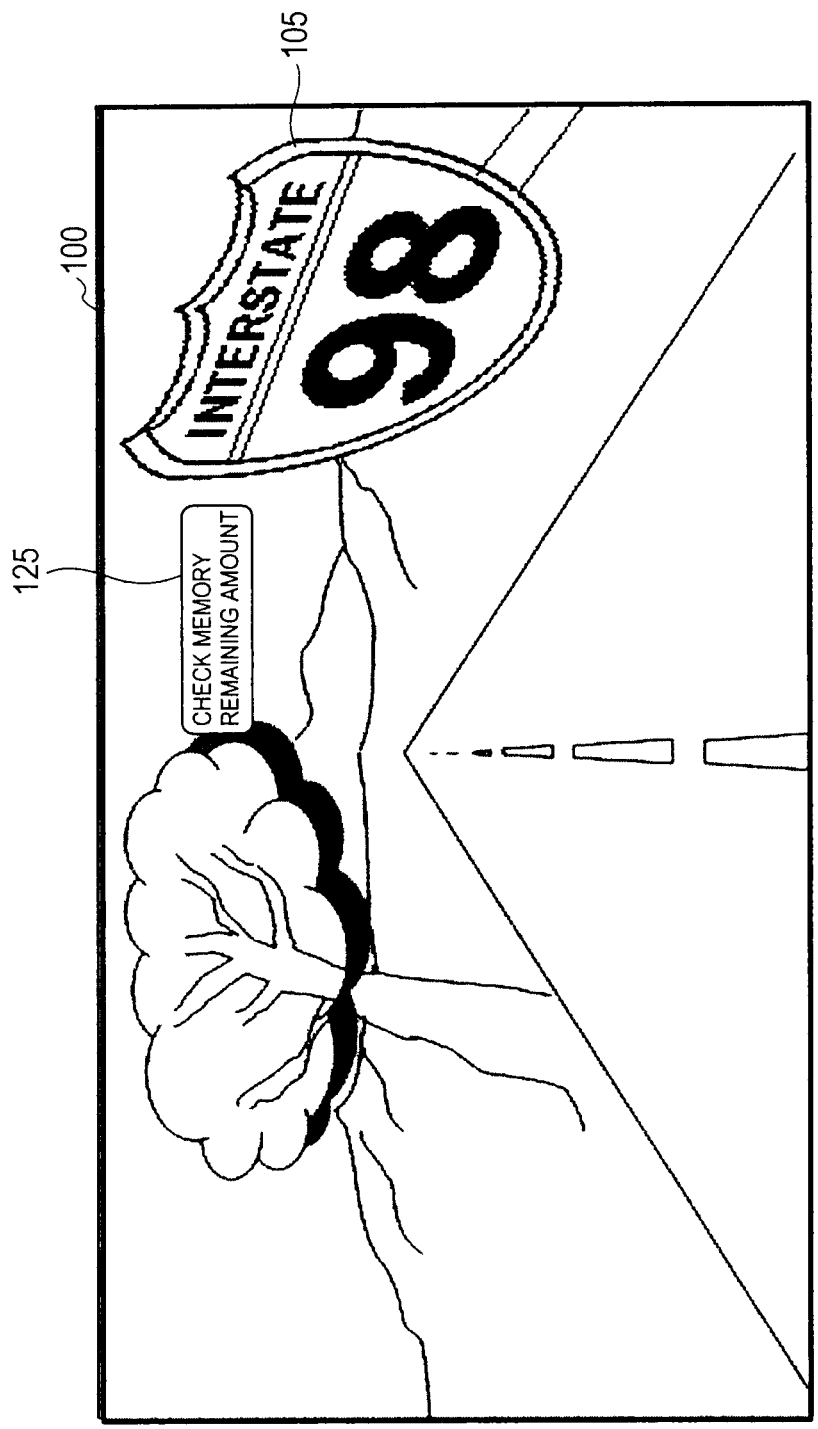
FIG. 6 is an explanatory diagram for describing a display processing example of the additional information which is controlled while following a processing example 5.

For example, additional information 125 illustrated in FIG. 6 is a processing example which is executed while the above-mentioned processing example 2 and processing example 4 are combined. That is, the processing example is illustrated in which these two processing examples are combined:

(Processing example 2) The processing example for adjusting the displayed character size of the additional information; and (Processing example 4) The processing example for carrying out the line feed adjustment of the character string of the additional information.

That is, the additional information 125 illustrated in FIG. 6 is the additional information obtained by decreasing the character size and also carrying out the line feed to have a two-line display.

This is the case where the elimination of the overlap with the other display object 105 is not realized even if the character string size is decreased while following the processing example 2, and at this time, the processing example 4 is further applied to feed the line to change the shape of the character display area. Through these combined processings, the overlap with the other three-dimensional display object is avoided.

As described above, it is possible to avoid the overlap with the three-dimensional image existing on the near side according to the method of reducing the display area of the additional information through the operation of the displayed character string, the size change, the conversion into the icon, or the like. It should be noted however that in a case where the three-dimensional image as the display target is a moving image, even if the determination on the overlap is carried out on the basis of an image at a certain moment and the display is changed, in a case where the image popping up on the near side changes at the next moment and the overlap is generated, the display is to be further changed.

At such a moment, if the display is immediately switched, the cumbersome change in the display mode occurs, which may rather degrade the visibility.

For this reason, a processing of determining a switching timing by evaluating a difference between the overlapped area and its depth amount and an overlapping period of time is executed. A detail of this processing will be hereinafter specifically described with reference to a flow chart illustrated in FIG. 7. The visibility of the additional information with respect to the observer can be increased while the frequent display change is avoided through this processing.

2. Regarding a Detail of a Processing Sequence Executed by the Image Processing Apparatus FIG. 7 is a flow chart for describing an example of a sequence of a display control processing on the additional information executed by the image processing apparatus.

Figure 7:
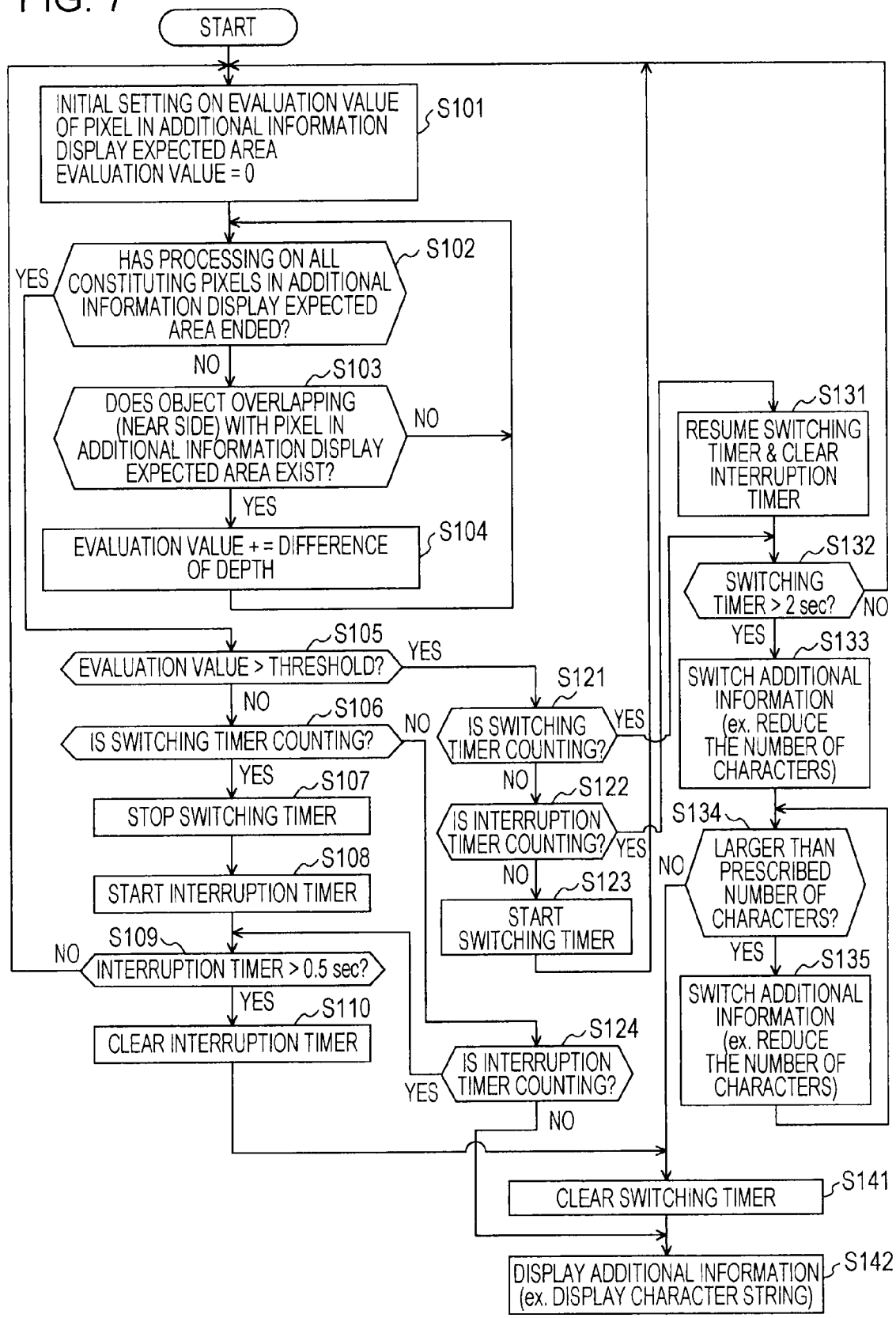
FIG. 7 is a flow chart for describing a display control processing sequence of the additional information.

In this processing following the flow illustrated in FIG. 7, an evaluation value corresponding to each pixel constituting the display area of the additional information expected to be displayed is calculated. That is, an evaluation value in accordance with a difference between the object having the overlap with the additional information and the depth is set, and the display mode of the additional information is controlled on the basis of the evaluation value.

The flow illustrated in FIG. 7 is executed, for example, under a control of a control unit provided with a CPU or the like which has a program execution function of the image processing apparatus. A processing in each step of the flow chart of FIG. 7 will be described.

First, an initial setting is carried out in step S101. In the initial setting, the evaluation value of each pixel constituting the display area of the additional information expected to be displayed is set as follows.

Evaluation value=0.

In step S102, a determination is carried out on whether or not the processing on all the pixels constituting the display expected area for the additional information, that is, the evaluation value calculation processing is ended. In a case where it is determined that the processing is ended, the flow advances to step S105.

In a case where the evaluation value setting processing on each pixel constituting the display area of the additional information expected to be displayed is not ended, the flow advances to step S103.

A processing in step S103 is a determination processing sequentially executed on each of the pixels constituting the displayed area of the additional information, and it is determined whether or not the three-dimensional display object overlapped with the pixel set as the processing target exists. In the present example, the description will be given while the display position of the additional information is set as a position of just 0 (a center in a depth direction (far side)/a pop-up direction (near side) of the display image) at the depth position. In this case, the overlap determination in step S103 is executed as the determination processing on whether or not the three-dimensional object displayed at a position in front of (on the near side with respect to) the pixel of the additional information at the display position where the depth position=0 exists.

In step S103, in a case where it is determined that the three-dimensional object displayed at the position on the near side exists at the pixel position of the processing target pixel, the flow advances to step S104, and in a case where it is determined that the relevant three-dimensional object does not exist, the flow returns to step S102.

In step S103, in a case where it is determined that the three-dimensional object displayed at the position on the near side exists at the pixel position of the processing target pixel, the flow advances to step S104, and in step S104, an update processing on the evaluation value is executed.

The evaluation value is obtained in the processing executed in which the additional information at the display position where the depth position=0 and the display position of the three-dimensional display object subjected to the overlap display, that is, the difference in the depth information is added to the calculated evaluation value.

That is, an evaluation value E becomes a value calculated as follows.

While the display position of the additional information (=0) is set as Ip, when the display position of the object overlapped with the additional information and displayed in front of the additional information is set as Op, with regard to each of the constituting pixels of the additional information expected to be displayed, $|Ip-Op|$ is calculated, and these values are added with respect to all the constituting pixels of the displayed area of the additional information. That is, the evaluation value E is calculated on the basis of the following expression.

The evaluation value $E=\Sigma|Ip-Op|$

When the processing on all the pixels of the additional information display expected area is ended and the final evaluation value is calculated, the flow advances to step S105.

In step S105, the calculated evaluation value is compared with a previously prescribed threshold.

Evaluation value>Threshold

In a case where the above-mentioned determination expression is satisfied, in this instance, in a case where the calculated evaluation value is larger than the previously prescribed threshold, the flow advances to step S121. On the other hand, in a case where the calculated evaluation value is not larger than the previously prescribed threshold, the flow advances to step S106.

In step S105, it is determined that the calculated evaluation value is not larger than the previously prescribed threshold, and when the flow advances to step S106, it is determined whether or not a switching timer set for the display switch control of the additional information is counting.

The switching timer is a timer for measuring a period of time previously prescribed for carrying out the display switch of the additional information. If the result to which the evaluation value is added exceeds the threshold, the switching timer is started for carrying out the time evaluation.

For example, in the present example, a shortest time interval for carrying out the display switch of the additional information is set as two seconds (2 sec). This is measures for preventing the frequent display change of the additional information. If the display switch of the additional information is frequently executed, flickering is generated. This is measures for preventing a situation in which it becomes difficult for the observer to check the additional information by such flickering.

The switching timer starts counting in a case where the switching condition of the additional information is generated, and in a case where the switching condition of the additional information is eliminated, the counting is temporarily interrupted.

This interruption time is measured by an interruption timer. In a case where the display switch condition of the additional information is not generated at a time point when the interruption time exceeds the previously prescribed period of time (in the present example, 0.5 sec), the switching timer is cleared, that is, reset.

In a case where the display switch condition of the additional information is generated at a time point when the interruption time exceeds the previously prescribed period of time (in the present example, 0.5 sec), the switching timer resumes the counting from the stopped time.

When this count of the switching timer (measured time) exceeds two seconds (2 sec) in total, the display switch of the additional information is executed.

In step S106, in a case where the switching timer is not counting, the flow advances to step S124, where it is determined whether or not the interruption timer for measuring the interruption time for the count of the switching timer is counting.

In step S124, in a case where it is determined that the interruption timer is not counting, the flow advances to step S142.

In step S142, the display of the additional information is executed. This display processing is the display of the additional information originally expected to be displayed.

That is, this processing is a processing in a case where the display is executed in which the overlap of the additional information and the other three-dimensional display object is small and no visual problem occurs even when the additional information is displayed as it is.

On the other hand, in a case where it is determined that the calculated evaluation value is not larger than the previously prescribed threshold in step S105 and the switching timer set for the display switch control of the additional information is counting in step S106, the flow advances to step S107.

In step S107, the switching timer is stopped.

Next, the flow advances to step S108, where the interruption timer is started. The interruption timer is a timer for counting a period during which the switching timer is stopped.

Next, the flow advances to step S109, where it is determined whether or not the count time of the interruption timer exceeds the previously prescribed period of time (for example, 0.5 sec). In a case where the count time does not exceed the previously prescribed period of time, the flow returns to step S101.

In step S109, when it is determined the count time of the interruption timer exceeds the previously prescribed period of time (for example, 0.5 sec), the flow advances to step S110, where the interruption timer is cleared, and the flow advances to step S141.

In step S141, the switching timer is cleared, and the flow advances to step S142.

In step S142, the display of the additional information is executed. This display processing is the display of the additional information originally expected to be displayed.

That is, this processing is a processing in a case where the display is executed in which the overlap of the additional information and the other three-dimensional display object is small and no visual problem occurs even when the additional information is displayed as it is.

Next, a description will be given of a processing in a case where it is determined that the determination processing in step S105, that is, Evaluation value>Threshold the above-mentioned determination expression is not satisfied.

In step S105, in a case where the calculated evaluation value is larger than the previously prescribed threshold, the flow advances to step S121.

In step S121, it is determined whether or not the switching timer set for the display switch control of the additional information is counting.

In a case where the switching timer is not counting, the flow advances to step S122, where it is determined whether or not the interruption timer for measuring the interruption time for the count of the switching timer is counting.

In step S122, when it is determined that the interruption timer is not counting, the flow advances to step S123.

In step S123, the switching timer is started, and the flow advances to step S131.

In step S131, the resumption of the count of the switching timer is carried out, and further, the clear processing on the interruption timer is carried out.

After that, the flow advances to step S132, where it is determined whether or not the count time of the switching timer exceeds the previously set period of time (2 sec). In a case where it is determined that the count time does not exceed the previously set period of time (2 sec), the flow returns to step S101.

In step S132, in a case where it is determined that the count time of the switching timer exceeds the previously set period of time (2 sec), the flow advances to step S133.

In step S133, a processing of switching the additional information that should be displayed is carried out. For example, by following one of the above-mentioned processing examples 1 to 5, a setting on the additional information that should be switched and displayed is carried out. Herein, a description will be given while it is assumed that the reduction in the number of characters in the processing example 1 is executed.

After the setting processing of the additional information that should be switched and displayed based on the reduction in the number of characters in step S133 is executed, the flow advances to step S134.

In step S134, it is determined whether or not the character string of the additional information after the switching is larger than the previously prescribed number of characters.

In step S134, in a case where it is determined that the character string of the additional information after the switching is larger than the previously prescribed number of characters, the flow advances to step S135. Furthermore, the number of characters is reduced, and the flow advances to step S134.

On the other hand, in step S134, in a case where it is determined that the character string of the additional information after the switching is not larger than the previously prescribed number of characters, the flow advances to step S141.

In step S141, the switching timer is cleared, the flow advances to step S142.

In step S142, the display of the additional information is executed. This display processing is executed as the display processing of the additional information which is controlled by one of the above-mentioned processing examples 1 to 5 instead of the additional information originally expected to be displayed.

That is, to eliminate or set to reduce the overlap of the additional information and the other three-dimensional display object, the additional information display as a result of the executed control such as the reduction in the number of characters is executed.

As described with reference to the flow illustrated in FIG. 7, in the processing according to the embodiment of the present disclosure, the time measurement is executed by utilizing the switching timer for measuring the period of time from the time of the generation of the switching condition of the additional information and the interruption timer for measuring the period of time from the elimination of the switching condition of the additional information. The respective measured times are compared with the predetermined threshold time, and the switching control of the additional information is executed on the basis of the comparison result. This processing is for suppressing the frequent switching of the additional information to carry out the stable display switching.

For example, the switching is not carried out in the case of a subtle display condition like a case in which the condition is not slightly met during two seconds of the switching time measured by the switching timer, or the like. That is, hysteresis is prepared to some extent as the time condition for the display switching processing.

For example, as in the reproduction display of the moving image, in a case where the overlap area of the additional information and the pop-up object is frequently change, the situation of the flickering display caused by the repetition of the frequent display switching of the additional information is prevented, and it is possible for the observer to stably check the additional information.

By executing the processing according to the embodiment of the present disclosure, when the additional information such as the character string, the icon, or the image is overlapped with the three-dimensional image, it is possible to carry out the overlap display of the additional information to the image with which the visibility is not deteriorated in a case where the image part popping up on the near side with respect to the three-dimensional image exists and also with which the meaning desired to be conveyed by the prescribed additional information can be sufficiently conveyed to the user.

Also, in a case where the three-dimensional image is the moving image, when the additional information such as the character string, the icon, or the image is overlapped, it is possible to overlap the additional information so that the cumbersome change in the display mode of the additional information in accordance with the change in the image is avoided and the influence onto the image is suppressed to minimum while the transmission of the information is realized.

3. Regarding a Hardware Configuration Example of the Image Processing Apparatus

Figure 8:
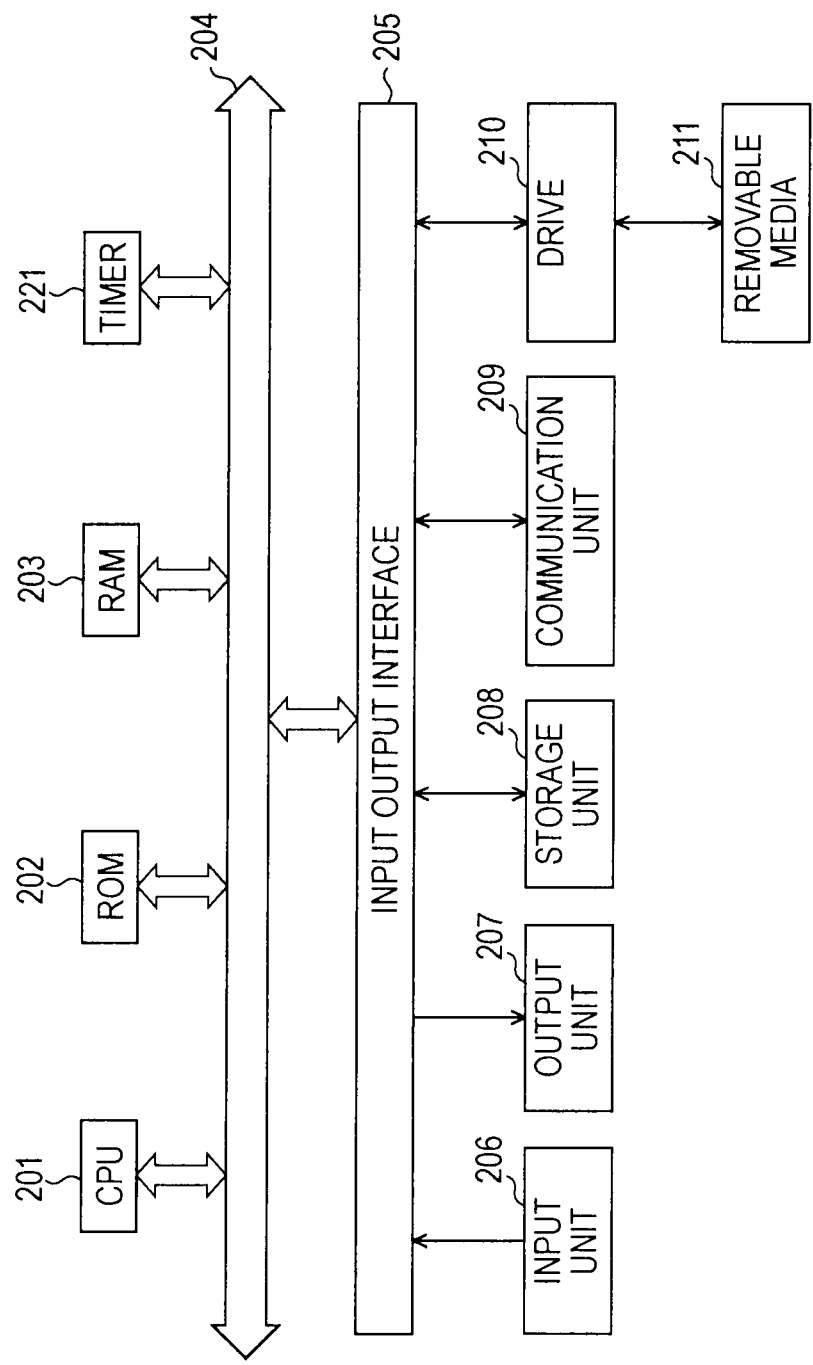
FIG. 8 illustrates a configuration example of an image processing apparatus.

Next, a hardware configuration example of the image processing apparatus that executes the above-mentioned processing will be described with reference to FIG. 8. FIG. 8 is a block diagram illustrating a configuration example of an image processing apparatus according to an embodiment of the present disclosure. The image processing apparatus is an apparatus that performs a processing of generating an output image by executing the above-mentioned display control on the additional information. To be more specific, for example, the image processing apparatus is an apparatus such as a television set, a reproduction apparatus, a video camera, or a PC.

A CPU (Central Processing Unit) 201 functions as a control unit (data processing unit) that executes various processings while following a program stored in a ROM (Read Only Memory) 202 or a storage unit 208. For example, the CPU 201 executes the display control on the additional information described in the above-mentioned embodiments.

A RAM (Random Access Memory) 203 appropriately stores the program executed by the CPU 201, data, and the like. The CPU 201, the ROM 202, and the RAM 203 are mutually connected by a bus 204.

The CPU 201 is connected to an input output interface 205 via the bus 204, and an input unit 206 composed of various switches, a key board, a mouse, a microphone, and the like and an output unit 207 composed of a display, a speaker, and the like are connected to the input output interface 205. The CPU 201 executes various processings while corresponding to instructions input from the input unit 206 and outputs processing results, for example, to the output unit 207.

The storage unit 208 connected to the input output interface 205 is composed, for example, of a hard disc or the like and stores the program executed by the CPU 201 and various pieces of data. A communication unit 209 performs a communication with an external apparatus via a network such as the internet or a local area network.

A drive 210 connected to the input output interface 205 drives removable media 211 such as a magnetic disc, an optical disc, an opto-magnetic disc, or a semiconductor memory and obtains various pieces of data such as recorded contents and the program.

A timer 221 is utilized as the switching timer and the interruption timer described with reference to the flow chart illustrated in FIG. 7.

In the above, the present disclosure has been described in detail with reference to the particular embodiments. However, it should be understood by those skilled in the art that various modifications, combinations, sub-combinations and alterations may occur depending on design requirements and other factors insofar as they are within the scope of the appended claims or the equivalents thereof. That is, the present disclosure has been disclosed by way of examples and should not be construed in a limited manner.

Also, the series of processings described in the specification can be executed by hardware, software, or a composite configuration of those. In a case where the processing is executed by the software, the processing can be executed while a program recording a processing sequence is installed into a memory in a computer incorporated in dedicated-use hardware or the program is installed into a general-use computer that can execute various processings. For example, the program can be previously recorded in a recording medium. In addition to the installment from the recording medium to the computer, the program can be received via a network such as a LAN (Local Area Network) or the internet and installed into the recording medium such as the built-in hard disc.

It should be noted that the various processings described in the specification are executed in a time-series manner while following the description but also may be executed in parallel or individually in accordance with a processing capacity of the apparatus that executes the processing or as the occasion arises. Also, the system in the present specification is a logical collective structure of a plurality of apparatuses and is not limited to a configuration in which the apparatuses of the respective structures are in the same casing.

It should be noted that the present disclosure can also take the following configurations.

1. An image processing apparatus comprising a control unit that executes a display processing for a three-dimensional image, wherein the control unit performs a processing of displaying additional information overlapped with the three-dimensional image at a prescribed depth position which is previously prescribed, and also calculates an evaluation value based on a difference between a depth position of a display object included in a display expected area of the additional information and the prescribed depth position for displaying the additional information, and executes a change processing of a display mode of the additional information in accordance with the evaluation value.

2. The image processing apparatus according to Claim 1, wherein the control unit executes a reduction processing of the number of characters of the additional information as the display mode change processing of the additional information.

3. The image processing apparatus according to Claim 1, wherein the control unit executes a change processing of a character size of the additional information as the display mode change processing of the additional information.

4. The image processing apparatus according to Claim 1, wherein the control unit executes a processing of changing characters of the additional information into an icon as the display mode change processing of the additional information.

5. The image processing apparatus according to Claim 1, wherein the control unit executes a processing of setting a line feed into a character string of the additional information as the display mode change processing of the additional information.

6. The image processing apparatus according to Claim 1, wherein the control unit calculates a difference with the depth position of the display object overlapped in units of pixels included in the display expected area of the additional information and adds the difference in units of pixels to all the pixels in the display expected area of the additional information to calculate the evaluation value, and decides whether or not the display mode of the additional information is changed on the basis of a comparison result between the calculated evaluation value and a previously prescribed threshold.

7. The image processing apparatus according to Claim 1, wherein the control unit performs a processing of changing the display mode of the additional information on condition that a period of time during which the evaluation value satisfies a switching condition of the additional information continues for a prescribed period of time which is previously prescribed or longer.

8. An image processing method of executing a display processing for a three-dimensional image in an image processing apparatus, the method comprising:

displaying additional information overlapped with the three-dimensional image at a prescribed depth position which is previously prescribed;

calculating an evaluation value based on a difference between a depth position of a display object included in a display expected area of the additional information and the prescribed depth position for displaying the additional information; and executing a change processing of a display mode of the additional information in accordance with the evaluation value.

9. A program for executing a display processing for a three-dimensional image in an image processing apparatus, the program causing to execute:

displaying additional information overlapped with the three-dimensional image at a prescribed depth position which is previously prescribed;

calculating an evaluation value based on a difference between a depth position of a display object included in a display expected area of the additional information and the prescribed depth position for displaying the additional information; and executing a change processing of a display mode of the additional information in accordance with the evaluation value.

What is claimed is:

1. An apparatus comprising:
    an overlap detector configured to determine if a first image superimposed with a second image overlaps an object in the second image by greater than a threshold; and
    a display modification unit configured to change the content of the first image superimposed with the second image such that the first image no longer overlaps the object in the second image by greater than the threshold when the overlap detector detects that the first image overlaps the object in the second image by greater than the threshold, the display modification unit being configured to change the content of the first image at a switch time, the display modification unit measuring the switch time from a time when the evaluation value exceeds the threshold to a time when the content is changed by the display modification unit.

2. The apparatus according to claim 1, wherein the display modification unit changes the content of the first image by removing at least a portion of text in the first image.

3. The apparatus according to claim 1, wherein the display modification unit changes the content of the first image by changing a font size of text in the first image.

4. The apparatus according to claim 1, wherein the display modification unit changes the content of the first image by replacing text in the first image with an icon.

5. The apparatus according to claim 1, wherein the display modification unit changes the content of the first image by changing a format of text in the first image to display the text on at least one additional line.

6. The apparatus according to claim 1, wherein the first image is a two-dimensional image.

7. The apparatus according to claim 1, wherein the second image is a three-dimensional image.

8. The apparatus according to claim 1, wherein the overlap detector is configured to calculate an evaluation value based on each pixel in the first image, and to compare the evaluation value to the threshold to determine if the first image overlaps the object.

9. The apparatus according to claim 1, wherein the display modification unit pauses a switch time count if the first image no longer overlaps the object in the second image by greater than the threshold before a switch time duration has elapsed.

10. The apparatus according to claim 9, wherein the display modification unit restarts the switch time count if the first image overlaps the object in the second image by greater than the threshold and a pause duration has not yet elapsed since the switch time count was paused.

11. The apparatus according to claim 10, wherein the display modification unit cancels changing the content of the first image if the pause duration has elapsed since the switch time count was paused.

12. The apparatus according to claim 11, wherein the pause duration is 0.5 seconds and the switch time duration is 2.0 seconds.

13. The apparatus according to claim 1, wherein the content of the first image is a message, a title, an error display, a menu, or an icon.

14. The apparatus according to claim 1, wherein the overlap detector is configured to determine if the first image is in front of the second image or if the second image is in front of the first image.

15. The apparatus according to claim 14, wherein the overlap detector is configured to determine if the first image is in front of the second image or if the second image is in front of the first image based on a depth position of the first image.

16. A method comprising:
    determining if a first image superimposed with a second image overlaps an object in the second image by greater than a threshold; and
    changing, using a processor, the content of the first image superimposed with the second image such that the first image no longer overlaps the object in the second image by greater than the threshold when the overlap detector detects that the first image overlaps the object in the second image by greater than the threshold, the changing including changing the content of the first image at a switch time, the switch time being measured from a time when the evaluation value exceeds the threshold to a time when the content is changed by the display modification unit.

17. A non-transitory computer readable medium encoded with a computer program that, when loaded on a processor, causes the processor to execute a method comprising:
    determining if a first image superimposed with a second image overlaps an object in the second image by greater than a threshold; and
    changing, using the processor, the content of the first image superimposed with the second image such that the first image no longer overlaps the object in the second image by greater than the threshold when the overlap detector detects that the first image overlaps the object in the second image by greater than the threshold, the changing including changing the content of the first image at a switch time, the switch time being measured from a time when the evaluation value exceeds the threshold to a time when the content is changed by the display modification unit.

* * * * *